United States Patent
Bensch et al.

(10) Patent No.: US 8,297,714 B2
(45) Date of Patent: Oct. 30, 2012

(54) VALVE UNIT FOR A BRAKE CONTROL DEVICE

(75) Inventors: Uwe Bensch, Hannover (DE); Jörg Helmer, Vogt (DE); Bernd-Joachim Kiel, Wunstorf (DE); Wilfried Menze, Springe (DE)

(73) Assignee: WABCO GmbH, Hannover (DE)

( * ) Notice: Subject to any disclaimer, the term of this patent is extended or adjusted under 35 U.S.C. 154(b) by 658 days.

(21) Appl. No.: 12/310,187

(22) PCT Filed: Jul. 4, 2007

(86) PCT No.: PCT/EP2007/005910
§ 371 (c)(1),
(2), (4) Date: Nov. 11, 2009

(87) PCT Pub. No.: WO2008/025400
PCT Pub. Date: Mar. 6, 2008

(65) Prior Publication Data
US 2010/0072810 A1 Mar. 25, 2010

(30) Foreign Application Priority Data
Aug. 31, 2006 (DE) .......................... 10 2006 041 012

(51) Int. Cl.
*B60T 13/40* (2006.01)
(52) U.S. Cl. ............................................. 303/7; 303/34
(58) Field of Classification Search .................. 303/3, 7, 303/15, 20, 29, 30, 37–40, 69–71, 81–83; 137/613, 614.14, 870
See application file for complete search history.

(56) References Cited

U.S. PATENT DOCUMENTS

| | | | |
|---|---|---|---|
| 4,655,255 A | | 4/1987 | Rode |
| 5,277,485 A * | | 1/1994 | Broome ..................... 303/119.1 |
| 5,433,306 A * | | 7/1995 | Yang ................................ 192/64 |
| 5,458,403 A * | | 10/1995 | Moody ............................. 303/7 |
| 5,466,053 A * | | 11/1995 | Koelzer ............................ 303/7 |
| 5,549,362 A * | | 8/1996 | Broome ........................... 303/3 |
| 5,577,814 A * | | 11/1996 | Engelbert et al. .......... 303/118.1 |
| 5,615,929 A * | | 4/1997 | Broome ........................... 303/7 |
| 6,026,860 A * | | 2/2000 | Teichmann ................... 137/870 |
| 6,079,790 A * | | 6/2000 | Broome ........................... 303/3 |
| 7,150,508 B2* | | 12/2006 | Ganzel ....................... 303/113.4 |
| 7,905,557 B2* | | 3/2011 | Frank et al. ................. 303/118.1 |
| 2005/0029859 A1* | | 2/2005 | Bensch et al. ................... 303/89 |
| 2008/0030068 A1* | | 2/2008 | Bensch et al. ................... 303/17 |
| 2009/0309413 A1* | | 12/2009 | Bensch et al. ................... 303/20 |

FOREIGN PATENT DOCUMENTS

| | | |
|---|---|---|
| DE | 35 01 708 A1 | 7/1986 |
| DE | 103 36 611 A1 | 3/2005 |
| EP | 1 571 061 A1 | 9/2005 |
| GB | 113 4032 A | 11/1968 |
| GB | 135 8110 A | 6/1974 |
| WO | WO 2006007970 * | 1/2006 |

* cited by examiner

*Primary Examiner* — Christopher Schwartz
(74) *Attorney, Agent, or Firm* — Kramer Levin Naftalis & Frankel LLP (57) ABSTRACT

An electropneumatic brake control device for controlling an air-quantity-boosting valve device which controls a parking brake of a vehicle. A valve unit is provided that has a vent valve for venting a control input of the air-quantity-boosting valve device. The vent valve has three states. In a first state, the control input of the air-quantity-boosting valve device can be vented in a throttled manner by using an aperture. In a second state, the control input of the air-quantity-boosting valve device cannot be vented. In a third state, the control input of the air-quantity-boosting valve device can finally be vented in an unthrottled manner.

18 Claims, 4 Drawing Sheets

VALVE UNIT FOR A BRAKE CONTROL DEVICE

FIELD OF THE INVENTION

The present invention generally relates to a valve unit for an electropneumatic brake control device for controlling an air-flow-boosting valve device which controls a vehicle parking brake.

BACKGROUND OF THE INVENTION

Valve devices for electropneumatic brake control devices for control of vehicle parking brakes are known, for example, from DE 103 36 611 A1 and EP 1571061 A1. Such known brake control devices are used in brake systems that are provided not only with a service brake, which can be actuated by means of a brake pedal, but also with a parking brake (often referred to as a handbrake), which can be actuated by means of an electrical signal transducer.

In these known brake systems, the parking brake is regularly applied by means of spring-actuated brake cylinders. In order to release the parking brake, the spring-actuator part of the spring-actuated brake cylinders must be pressurized with compressed air. For this purpose, air must be admitted to the spring-actuator part. The necessary pressure for air admission is supplied from a compressed-air reservoir. However, this pressure supply is not permanently turned on, but can be shut off. Furthermore, the pressure in the spring-actuated brake cylinder can also be lowered, and, so, the spring-actuator part can be vented. The parking brake is applied by such venting.

To control the pressure in the spring-actuated brake cylinder, a relay valve is conventionally provided. With this relay valve, the pressure supply from the compressed-air reservoir tank to the spring-actuator part of the spring-actuated brake cylinders can be controlled. Control is exercised with the assistance of electropneumatic valve devices, especially, by means of electrically actuatable solenoid valves, which regulate a control pressure supplied to the relay valve.

In the brake system described in DE 103 36 611 A1, a bistable valve is used for this purpose. This valve can occupy two stable conditions. In the event of a power failure, it maintains the condition set at that instant. Furthermore, a holding valve is connected between the bistable valve and the control input of the relay valve in this brake system. By means of the bistable valve and of the holding valve, the pressure at the control input can be held, raised or lowered. The pressure at the output of the relay valve varies correspondingly. In this way, the parking brake can be released or applied by means of electrical signals to the bistable valve and holding valve.

Because of its construction, however, the bistable valve is complex and, therefore, expensive. Furthermore, as noted above, the bistable valve remains in its previous condition in the event of failure of the electrical power supply. Thus, a vehicle having such a brake system might not be able to be safely parked in the event of failure of the electrical power supply. In other words, it might not be able to be parked by automatic and permanent venting of the spring-actuator part of the spring-actuated brake cylinders—that is, by application of the parking brake.

Electromagnetically actuatable multi-way valves of less complex construction are proposed in DE 35 01 708 A1. In particular, it is proposed that two valves disposed opposite one another be provided in a multi-way valve. An armature that cooperates with a coil disposed between the two valves is associated with each of these two valves. The springs associated with these armatures are designed such that different magnetic forces are necessary for actuation of the two valves. These magnetic forces are generated by application of a current flowing through the coil. Because a separate armature is associated with each valve, mutually independent actuation of the two valves is possible by appropriate energization of the coil.

However, this known valve has the disadvantage that, in de-energized condition, its input is in communication with the output leading to the consuming load, whereas the outlet of the valve is shut off. If such a valve were to be used instead of the aforesaid bistable valve and holding valve, the full reservoir pressure would be injected into the control input of the relay valve in the event of failure of the electrical power supply, causing the parking brake to be released by the resulting admission of air to the spring-actuator part of the spring-actuated brake cylinders. This is undesirable, however, since the vehicle might no longer be safely parked in the event of failure of the electrical power supply.

SUMMARY OF THE INVENTION

Generally speaking, it is an object of the present invention to provide a valve unit for an electropneumatic brake control device for control of an air-flow-boosting valve device for actuating a parking brake of a vehicle, which valve unit permits the vehicle to be parked safely even in the event of failure of the electrical power supply.

In accordance with embodiments of the present invention, by using a vent valve with three operating state or conditions to vent a control input of an air-flow-boosting valve device, it is possible to achieve multi-stage venting. In a first condition of the vent valve, the control input of the air-flow-boosting valve device is throttled via an orifice and, in this way, can be vented slowly. This throttled venting corresponds to a first venting stage. In a further operating condition of the vent valve, the control input of the air-flow-boosting valve device is not throttled and, thus, can be vented suddenly. This unthrottled venting corresponds to a second venting stage. In yet a further operating condition of the vent valve, it is provided that the control input of the air-flow-boosting valve device is not vented.

The throttled venting of the control input is advantageous when the parking brake of the vehicle is to be applied slowly. This is desirable, in particular, in the event of failure of the electrical power supply, since the vehicle can then be braked slowly and parked safely. Sudden complete venting of the control input of the air-flow-boosting valve device and, thus, of the spring-actuator part of the spring-actuated brake cylinders, is practical when the driver has already brought the vehicle to a stop, for example, by means of the service brake, and intends to apply the parking brake. This can take place suddenly without the expectation that it will cause a traffic hazard.

Preferably, the vent valve is designed as a double-armature solenoid valve having two magnet armatures disposed in a common armature-guide housing and loaded with one spring each, namely, a primary armature and a secondary armature, which can be actuated respectively by a solenoid provided for both magnet armatures. By means of a vent valve provided as a double-armature solenoid valve, two armatures and, thus, two sub-valves of the double-armature solenoid valve can be actuated with only one coil. First, this reduces the complexity of the construction of the multi-stage vent valve. Second, the complexity of contacting and of electrical activation of the valve unit is reduced, since only two ports are necessary for the solenoid, even in the case of the multi-stage vent valve.

Likewise, the number of output stages needed for energization of the solenoid valve is reduced, including the components belonging to such output stages. Furthermore, the entire current consumption is reduced by the use of only one coil for two sub-valves. As a result, favorable heating behavior of the brake control device is achieved.

Furthermore, the construction of the valve unit is compact compared with a valve unit that would be provided for multistage venting of a plurality of independent valves. By virtue of the more compact construction and of the smaller number of components, it is also possible to lower the manufacturing costs.

Preferably, the double-armature solenoid valve has an inlet that can be placed in communication with the control input of the air-flow-boosting valve device and is associated with the secondary armature. Advantageously, it further has a first outlet that can be placed in communication with a venting device and is associated with the primary armature as well as a second outlet that can be placed in communication with the venting device and is associated with the secondary armature. In this case, the first and second outlets can be placed in communication with the venting device in such a way that the first is throttled via the orifice while the second is unthrottled. When the solenoid is de-energized, the primary armature and the secondary armature are in their home positions established by spring loading, wherein the vent valve occupies its first condition and the control input of the air-flow-boosting device can be vented in throttled manner via an orifice. For this purpose, the inlet of the vent valve is in communication with its first outlet and the inlet is shut off from the second outlet. In this de-energized condition, permanent throttled venting of the control input of the air-flow-boosting valve device is achieved and thus, throttled venting of the spring-actuated brake cylinders. In this way, the parking brake is applied slowly. Thus, a moving vehicle is braked slowly and can be parked safely because of the permanent venting of the spring-actuated brake cylinders.

Upon injection of a first low current into the solenoid, only the primary armature is energized at first and, in this way, is displaced to its switching position. At this low current, however, the secondary armature remains in its spring-loaded home position. In these switching positions, the inlet of the vent valve is shut off from both the first and second outlets. The vent valve therefore occupies its second condition, in which the control input of the air-flow-boosting valve device cannot be vented but the pressure at the control input can be maintained at its existing value.

By injection of a higher current into the solenoid, the secondary armature is also displaced to its switching position, and, so, the inlet of the vent valve is in communication with its second outlet, which leads directly to venting. Preferably, this inlet of the vent valve is shut off from its outlet leading to the throttled first outlet. The vent valve then occupies its third condition, in which the control inlet of the air-flow-boosting valve device can be vented in unthrottled manner. In this condition, the control input of the air-flow-boosting valve device and, thus, also of the spring-actuator part of the spring-actuated brake cylinders can be vented suddenly. Consequently, the parking brake can be applied suddenly by establishing this condition.

In an alternative embodiment, the third condition for sudden venting can already be attained during injection of the lower, first solenoid current, whereas the second condition, in which the inlet of the vent valve is shut off from both of its outlets, is occupied only during injection of the second, higher solenoid current.

In a further advantageous embodiment, the spring force exerted on the primary armature by an associated spring is smaller than the spring force exerted on the secondary armature by a further spring associated with the secondary armature. Advantageously, springs of different strengths are used for this purpose. By this measure, the switching behavior of the solenoid-valve system can be improved.

In yet a further advantageous embodiment, the primary armature and the secondary armature have different diameters. In particular, the secondary armature has a smaller diameter than the primary armature. This results in the advantage that the structure of the armature-guide arrangement can be configured such that it can be mounted in the coil from one side, together with the two magnet armatures; also, this results in the advantage that, by virtue of the different sizes, especially diameters of the armatures, different magnetic forces act on the armatures. As a result, the switching behavior of the valve unit can be favorably influenced. More specifically, it is intended that the primary armature will be pulled in first by the solenoid at a first low current flowing through the solenoid and that the secondary armature will also be pulled in only when a higher current is flowing through the solenoid.

In another advantageous embodiment, the primary armature and the secondary armature are of identical design. This has the advantage that the manufacturing costs of these armatures can be reduced by virtue of larger production runs.

In a still further advantageous embodiment, the primary armature and the secondary armature are pulled to different depths into the solenoid. In particular, the primary armature is pulled more deeply into the solenoid than is the secondary armature. This has the advantage that the magnetic force exerted by the solenoid on the primary armature is greater than the magnetic force exerted by the solenoid on the secondary armature. Also, as a result, the switching behavior of the valve unit is favorably influenced.

Preferably, both the vent valve and an air-admission valve are provided in the valve unit. In this case, the inlet of the air-admission valve is in communication with a first connecting member that can be placed in communication with a compressed-air reservoir. Furthermore, the first outlet of the vent valve is in communication via the orifice and the second outlet of the vent valve with a second connecting member that can be placed in communication with the venting device. Also, the outlet of the air-admission valve is in communication with the inlet of the vent valve and with a third connecting member that can be placed in communication with the control input of the air-flow-boosting valve device.

In the present context, the term "connecting member" is to be understood to comprise any kind of connecting means, especially, for example, pneumatic connecting lines, connecting ducts, connecting bores or other passages as well as connecting ports, especially ports for pneumatic connecting lines, ducts and bores.

The valve unit can be designed either as a stand-alone device or as a non-independent, integral part of a brake control device.

In an exemplary embodiment of the valve unit as a stand-alone device, a very compact construction is achieved, in which both the vent valve and the air-admission value are mounted in a common unit, advantageously in a common housing. This unit functions with only three pneumatic and three electrical ports. This compact construction reduces the number of necessary components and, thus, also the manufacturing costs.

Still other objects and advantages of the present invention will in part be obvious and will in part be apparent from the specification.

The present invention accordingly comprises the features of construction, combination of elements, and arrangement of parts that will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
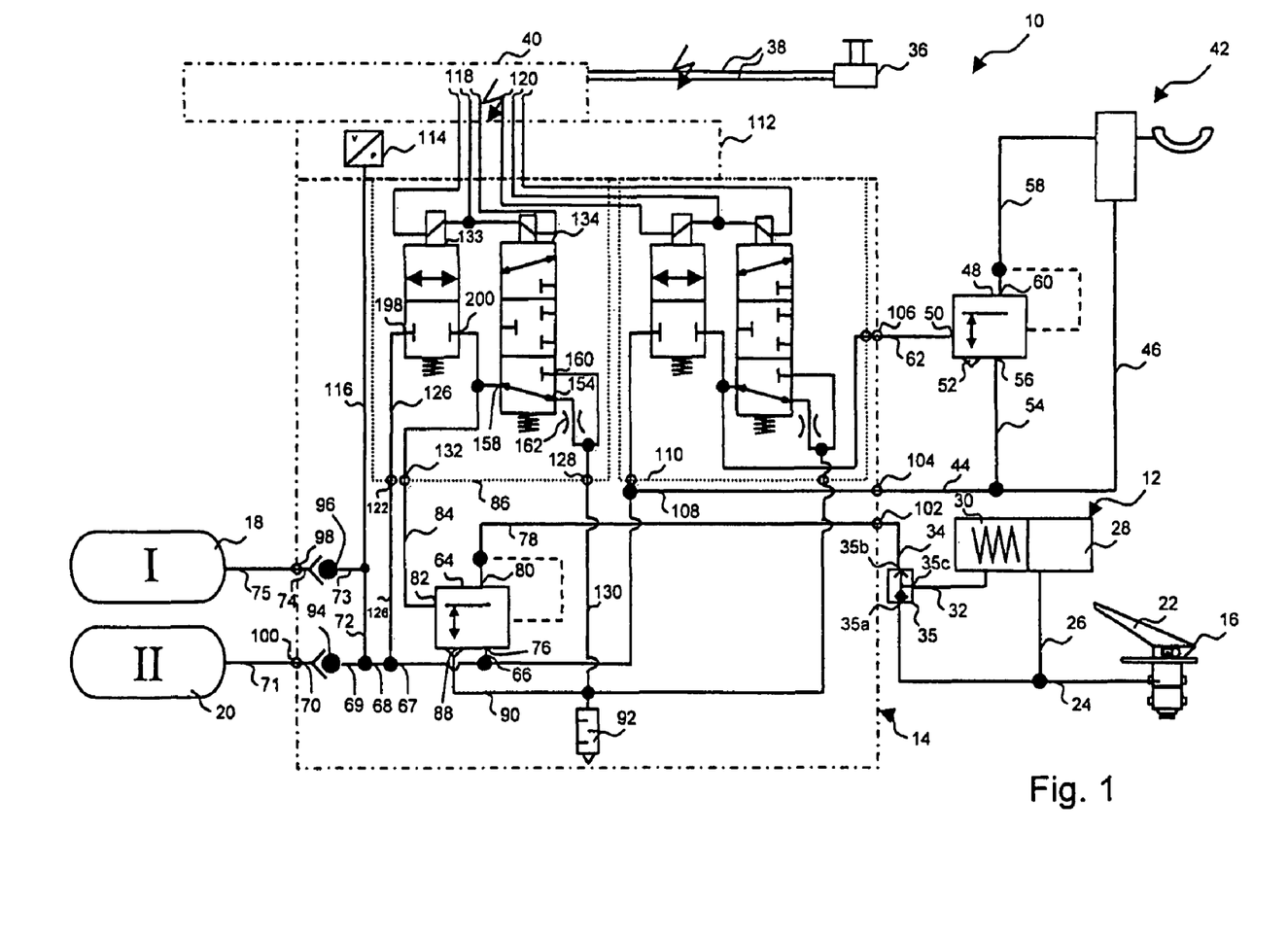
FIG. 1 is a simplified schematic diagram of an air-brake system having an electropneumatic brake control device for control of a parking brake, including two valve units according to an exemplary embodiment of the present invention.

Referring now to the drawing figures, FIG. 1 schematically shows part of an air-brake system 10 for a vehicle, especially an electropneumatic brake control device for control of a parking brake of the vehicle. Such air-brake systems are used, for example, in commercial vehicles, heavy motor trucks or buses. Such brake systems are used in particular in vehicle trains comprising a tractor and a trailer.

FIG. 1 shows only some components of brake system 10 that are helpful to understanding the present invention. Brake system 10 is electrically controlled, meaning that the metering of brake pressure to brake cylinders for actuation of wheel brakes provided on the vehicle wheels is controlled by electrical or electronic control elements. The brake cylinders are designed partly or completely as combination service and spring-actuated brake cylinders 12 (for simplicity, only one such brake cylinder is illustrated in FIG. 1). The spring-actuator part is controlled by an electropneumatic brake control device designed as parking-brake module 14 for control of the parking brake.

Brake system 10 is provided with a brake-force transducer 16, which senses braking intent of the vehicle operator. Brake-force transducer 16 comprises an electrical part and a pneumatic or hydraulic part (only the pneumatic part is illustrated in FIG. 1). Via compressed-air lines (not illustrated), the pneumatic part is supplied with compressed air by a first compressed-air reservoir tank 18 and a second compressed-air reservoir tank 20. Compressed-air reservoir tanks 18, 20 are used to supply compressed air to the brake cylinders of the service brakes. As illustrated in FIG. 1, however, they can also be used to supply compressed air to the parking brake. Alternatively, the compressed air for the parking brake can be supplied by a separate compressed-air reservoir tank.

By actuation of a brake pedal 22, brake-force transducer 16 generates a pneumatic manipulated variable either by electrical activation of electropneumatic devices or directly, the variable being passed via a compressed-air line 24, 26 to combination service and spring-actuated brake cylinder 12.

Combination service and spring-actuated brake cylinder 12 is designed as a combination spring-actuator/diaphragm cylinder. Besides the function of a diaphragm cylinder, it additionally has a spring-actuator function. Brake cylinder 12 is therefore provided with a diaphragm part, which is in communication pneumatically with the service-brake system and can be pressurized with the actual brake pressure, and with a spring-actuator part 30, which is pneumatically separated from diaphragm part 28 and can be pressurized with compressed air via separate compressed-air lines 32, 34. Spring-actuator part 30 forms part of the parking brake. Spring-actuator part 30 includes the spring-actuator function, which preloads an actuator spring upon pressurization of spring-actuator part 30 and, thus, prevents or diminishes braking action of the spring-actuator function, whereas the actuator spring relaxes upon venting of spring-actuator part 30 and, thus, in connection with the spring-actuator function, exerts a braking action on the brake in communication with the respective brake cylinder. In the present context, brake cylinders of this type will be referred to as "spring-actuated brake cylinders".

To prevent mechanical overloading of the brake mechanism, an overload-protection valve 35 is provided, which is designed as a changeover valve or select-high valve and is connected between spring-actuator part 30, a pneumatic output 102 of the parking-brake module and the output of brake-force transducer 16 having the modulated pressure. Overload-protection valve 35 selects the higher of two pressures present at its two inputs 35a, 35b, namely, the higher of the modulated brake pressure at the output of brake-force transducer 16 and the pressure made available by air-flow-boosting valve device 64. It supplies this selection via its output 35c to spring-actuator part 30 of spring-actuated brake cylinder 12. Overload-protection valve 35 prevents addition of the brake force supplied by the service brake, or, in other words, via the pneumatic part of diaphragm part 28, to the brake force supplied by the parking brake, or, in other words, spring-actuator part 30, so that, in this way, it prevents mechanical overloading of the brake mechanism of the wheel brake associated with this brake cylinder. By virtue of the illustrated structure, the brake force supplied to the brake cylinder via diaphragm part 28 is not increased by the brake force exerted by spring-actuator part 30, since, in the case of actuation of the service brake, the brake force exerted by the actuator spring is reduced by a force corresponding to actuation of the service brake. In this way, critical overloading of the corresponding wheel brake can be avoided.

By means of the spring-actuated brake cylinder, a parking-brake function is achieved that also permits the vehicle to be braked or immobilized even in the absence of compressed air. The parking-brake function is active when the respective spring-actuator part 30 of spring-actuated brake cylinder 12 is vented below a minimum pressure value. Via compressed-air lines 32, 34, spring-actuator part 30 of brake cylinder 12 is pneumatically in communication with parking-brake module 14. This parking-brake module 14 permits pressure control by way of electronic control means.

A manually actuatable parking-brake signal transducer 36 is electrically connected via a multi-conductor electrical line 38 to an electrical control unit 40 of parking-brake module 14. Via appropriate electrical lines, the electrical devices in the vehicle are supplied with energy by an electrical power supply device (not illustrated), such as, for example, a vehicle battery.

The vehicle is suitable for coupling a trailer having a further parking brake equipped with spring-actuated brake cylinders. Brake system 10 is therefore provided with what is known as a tractor-truck protection valve 42, which is used for brake-pressure control, especially of the parking brake of the trailer. Via compressed-air lines 44, 46, tractor-truck protection valve 42 is supplied with the reservoir pressure of compressed-air reservoir tanks 18, 20. Furthermore, a pressure modulated by means of an air-flow-boosting valve device, namely, a relay valve 48, and intended for the parking brake of the trailer is supplied to tractor-truck protection valve 42.

Relay valve 48 is provided with a control input 50, a vent port 52 that can be placed indirectly or directly in communication with the atmosphere and an inlet 56 that, via a compressed-air line 54, can be placed in communication with the reservoir pressure of compressed-air reservoir tanks 18, 20 as well as an outlet 60 that, via a compressed-air line 58, can be placed in communication with tractor-truck protection valve 42. Via a compressed-air line 62, control input 50 is in communication with parking-brake module 14.

At its outlet 60, relay valve 48 delivers to compressed-air line 58 an output pressure that corresponds to the pressure injected via compressed-air line 62 at control input 50 and, thus, to the pressure in a control chamber of relay valve 48. Relay valve 48 draws the compressed air needed for this purpose from compressed-air supply line 54, which is in communication with inlet 56 of relay valve 48 and, via further compressed-air lines, is in communication with compressed-air reservoir tanks 18, 20.

Parking-brake module 14 is provided with an air-flow-boosting valve device in the form of a relay valve 64 for the tractor. Relay valve 64 comprises an inlet 76 in direct or indirect communication via compressed-air lines 66 to 75 with compressed-air reservoir tanks 18, 20. Furthermore, relay valve 64 is provided with an outlet in communication via compressed-air lines 78, 34, 32 with spring-actuator part 30 of brake cylinder 12, and has a control input 82, which is in communication via a compressed-air line 84 with a valve unit 86 for control of the parking brake of the tractor.

At its outlet 80, relay valve 64 delivers to a compressed-air line 78 an output pressure that corresponds to the pressure injected via compressed-air line 84 at control input 82 and, thus, to the pressure in a control chamber of relay valve 64. Relay valve 64 draws the compressed air needed for this purpose from compressed-air supply line 66, which is in communication with inlet 76 of relay valve 64. Any venting of compressed-air line 78 that may be necessary takes place via a vent port 88 in indirect or direct communication with atmosphere. In the exemplary embodiment shown in FIG. 1, this vent port 88 is in communication via a compressed-air line 90 with a venting device 92.

Parking-brake module 14 is further provided upstream from compressed-air reservoir tanks 18, 20 with check valves 94, 96, respectively, which, in the event of a pressure drop or of detachment of or damage to compressed-air lines 71 and 75, respectively, to compressed-air reservoir tanks 20 and 18, respectively, prevent a pressure drop or pressure loss from occurring in parking-brake module 14. Such a pressure drop or pressure loss is undesirable, since it could lead, in particular, to sudden application of the parking brake and, thus, to emergency braking of the tractor. Under certain circumstances, this might cause an uncontrollable driving situation.

Parking-brake module 14 is provided with a plurality of pneumatic ports 98, 100, 102, 104, 106. Via port 98, compressed-air line 74 is in communication with compressed-air line 75 for connection of first compressed-air reservoir tank 18. Via port 100, compressed-air line 70 is in communication with compressed-air line 71 for connection of second compressed-air reservoir tank 20. Via port 102, compressed-air line 78 is in communication with compressed-air line 34 for placing relay valve 64 in communication with brake cylinder 12. Via port 104, compressed-air line 44 to relay valve 48 is in communication via the trailer controller with a compressed-air line 108 and, thus, via compressed-air lines 67 to 75 with compressed-air reservoir tanks 18, 20. Via port 106, compressed-air line 62 to control input 50 of relay valve 48 for the trailer controller is in communication with a valve unit 110 disposed in parking-brake module 14 for control of the trailer parking brake.

Parking-brake module 14 is further provided with a pressure sensor 114, which is mounted within cover 112 and is used for monitoring the reservoir pressure inside parking-brake module 14. For this purpose, pressure sensor 114 is in communication via a pressure line 116 with pressure line 72 and, thus, is directly or indirectly in communication with pressure lines 66 to 71, 73 to 75 as well as lines 108, 44 and 46.

Electrical control unit 40, by means of which valve unit 86 as well as valve unit 110 can be switched electrically via electrical lines 118, 120, is also disposed in the area of cover 112.

The two valve units 86 and 110 disposed in parking-brake module 14, just as relay valve 48 for the trailer and relay valve 64 for the tractor, are of identical design and are connected in the same way, as shown in FIG. 1. Hereinafter, the discussion will focus on valve unit 86, although the discussion will apply equally to valve unit 110.

According to an exemplary embodiment of the present invention, valve units 86 and 110 have the form of stand-alone subassemblies. Alternatively, however, valve units 86 and 110 can be implemented integrally in a single uniform parking-brake module 14, either individually or together with relay valve 64, and possibly also with relay valve 48. When valve units 86 and 110 are stand-alone components, the valve units have pneumatic ports, as will be discussed in greater detail hereinafter. However, if the valve units are integrated into the parking-brake module, such ports are omitted in favor of appropriate connecting lines. The present application therefore uses the generic term "connecting member" to mean any kind of connecting means, or, in other words, both ports and other types of connections, such as, for example, connecting lines, connecting ducts or bores and other like structures. Hereinafter, the term "port" as used in connection with valve units 86 and 110 is to be understood as a connecting member, so that, in this way, the exemplary embodiment in which valve units 86 and 110 are integrated into parking-brake module 14 can also be explained.

Valve unit 86 is provided with a first port 122, which, via compressed-air lines 126, and 68 to 75, is in communication with compressed-air reservoir tanks 18, 20. Valve unit 86 is further provided with a second port 128, which, via compressed-air line 130, is in communication with venting device 92. Venting device 86 is further provided with a third port 132, which, via compressed-air line 84, is in communication with control input 82 of relay valve 64. Valve unit 86 is provided with an air-admission valve 133 as well as a vent valve 134. Air-admission valve 133 is designed as a 2/2-way solenoid valve. Vent valve 134 is designed as a double-armature solenoid valve with three switched conditions.

Figure 2:
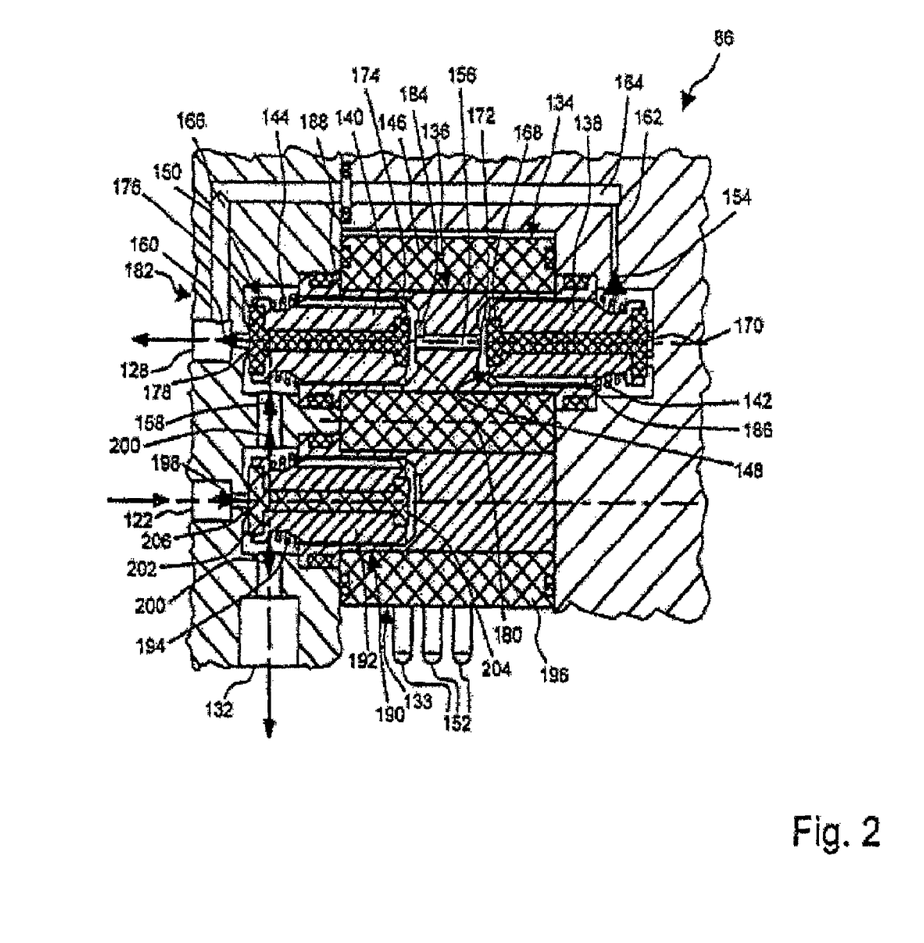
FIG. 2 shows a valve unit according to an exemplary embodiment of the present invention for the brake control device according to FIG. 1.

The structural design of valve unit 86 is shown in FIG. 2. Vent valve 134 is provided with two magnet armatures 138, 140 disposed in a common armature-guide arrangement 136. Armature-guide arrangement 136 is designed as an armature-guide tube, wherein the inside tube diameter is constant at least over some portions and is matched to the outside diameter of magnet armatures 138, 140. A first magnet armature, namely, primary armature 138, is loaded by means of a spring 142 and is therefore compressed toward the right in the diagram according to FIG. 2. Analogously, a second magnet armature, namely, secondary armature 140, is loaded with a spring 144, which compresses magnet armature 140 toward the left in the diagram shown in FIG. 2. Armature-guide arrangement 136 is surrounded by a solenoid 146. The outside diameter of armature-guide arrangement 136 is matched to the inside diameter of solenoid 146. Upon injection of suitable solenoid currents into solenoid 146, solenoid 146 pulls primary armature 138 and, possibly, secondary armature 140 in the direction of the interior of the coil. Primary armature 138 is provided as an operating element for a first sub-valve 148, and secondary armature 140 is provided as an operating element for a second sub-valve 150. Valve unit 86 is provided with three electrical ports 152, which are connected by means of electrical lines 118 to electrical control unit 40. Two of the three electrical ports 152 are connected to solenoid 146 of vent valve 134.

When solenoid 146 is de-energized, both primary armature 138 and secondary armature 140 are located in their home positions, determined by springs 142, 144, as illustrated in FIGS. 1 and 2. In its home position, sub-valve 148 associated with primary armature 138 places a first outlet 154 of vent valve 134 in communication with a conduit 156 extending along armature-guide arrangement 136. In a switched position of sub-valve 148, magnet armature 138 shuts off first outlet 154 from conduit 156. In its home position, second sub-valve 150 shuts off an inlet 158 from a second outlet 160. In this home position, conduit 156 is further in communication with inlet 158, whereas conduit 156 is shut off from second outlet 160. In its switched position, second sub-valve 150 places inlet 158 of vent valve 134 in communication with the second outlet of vent valve 160. Via an orifice 162 and ducts 164, 166, first outlet 154 of vent valve 134 is pneumatically in communication with second port 128. Orifice 162 acts as a throttle and reduces the cross section of the pneumatic line at first outlet 154 of vent valve 134.

When solenoid 146 is de-energized, both primary armature 138 and secondary armature 140 are in their illustrated home positions. If solenoid 146 is operated with a first, low current, which is supplied via ports 152 of first solenoid 146, primary armature 138 shifts into its switched position, or, in other words, is pulled inward in the direction of the interior of solenoid 146. If the current flowing through solenoid 146 is further increased, secondary armature 140 also shifts into its switched position, or, in other words, is pulled inward in the direction of the interior of the solenoid.

Elastomeric inserts 168, 170 are disposed at both ends of primary armature 138, or at least at the end of primary armature 138 facing conduit 156. Elastomeric inserts 168, 170 can also be designed in one piece, by providing primary armature 138 with a through bore, through which there extends an elastomeric of corresponding one-piece design. Elastomeric insert 168, which faces conduit 156, forms a valve seat together with a corresponding shaped projection 172 on armature-guide arrangement 136.

Secondary armature 140 is provided with an elastomeric insert 174, 176 at each of its two ends. These elastomeric inserts may also be designed as separate pieces or, as illustrated in FIG. 2, as one piece. In the one-piece construction, the elastomeric insert passes through a conduit extending through secondary armature 140. Elastomeric inserts 174, 176 protruding at both ends of secondary armature 140 form valve seats together with corresponding shaped projections 178, 180 on a valve head 182 or on armature-guide arrangement 136. By means of elastomeric inserts 174, 176 and the shaped projections 178, 180, it is possible to shut off second outlet 160 of vent valve 134 or conduit 156. By virtue of a recess 184 in the region of shaped projection 180 on armature-guide arrangement 136, the valve seat between the elastomeric insert and shaped projection 178 always remains open. However, recess 184 can also be omitted. In such a case, elastomeric insert 174 would completely close shaped projection 178 in the switched position of secondary armature 140. Primary armature 138 and secondary armature 140 each have substantially rotationally symmetric design. However, they each have a slot-like recess 186, 188 extending along the respective armature. Recess 186 of the primary armature establishes communication between first outlet 154 of vent valve 134 and conduit 156 when primary armature 138 is in its home position. Recess 188 of secondary armature 140 establishes communication between recess 184 or conduit 156 and inlet 158 or second outlet 160 of the vent valve when secondary armature 140 is in its home position.

Air-admission valve 133 is formed within valve unit 86. It is provided with a magnet armature 192 disposed in a further armature-guide arrangement 190. Armature-guide arrangement 190 is provided with a tubular portion having an inside diameter matched to the outside diameter of magnet armature 192. Magnet armature 192 is loaded by means of a spring 194 and is compressed toward the left in the diagram depicted in FIG. 2. Armature-guide arrangement 190 is surrounded by a solenoid 196. The outside diameter of armature-guide arrangement 190 is matched to the inside diameter of solenoid 196. Upon injection of a solenoid current of predefined magnitude into solenoid 196, solenoid 196 pulls magnet armature 192 in the direction of the interior of the coil. Magnet armature 192 is provided as an operating element for air-admission valve 133. Solenoid 196 is provided with two electrical ports 152, one of the two ports coinciding with one of the two ports of solenoid 146. Thus, three ports 152 in total are sufficient for valve unit 86 in order to electrically connect solenoid 146 of vent valve 134 and also solenoid 196 of air-admission valve 133. All three ports 152 are connected by means of electrical lines 118 to electrical control unit 40.

When solenoid 196 is de-energized, magnet armature 192 is located in its home position illustrated by springs 194 in FIGS. 1 and 2. In its home position, air-admission valve 133 shuts off its inlet 198 and, therefore, first outlet 122 of valve unit 86 in pneumatic communication with this inlet 198 from outlet 200 of air-admission valve 133. On the one hand, outlet 200 is in communication with third port 132 of valve unit 86, which leads to control input 82 of relay valve 64. On the other hand, outlet 200 is also in communication with inlet 158 of vent valve 134.

Upon injection of a current of predefined magnitude into solenoid 196, magnet armature 192 is displaced into its switched position. In the process, inlet 198 and, thus, first port 122 of valve unit 86 is placed in communication with outlet 200 of air-admission valve 133. In this way, compressed air can be supplied via compressed-air lines 68 to 75, 84, 126 from compressed-air reservoir tanks 18, 20 to control input 82 of relay valve 64. If magnet armature 192 remains in its home position, the pressure at control input 82 of relay valve 64 can be maintained even if inlet 158 of vent valve 134 is shut off from its outlets 154, 160. If, in contrast, the pressure at control input 82 of relay valve is to be lowered, air-admission valve 133 is de-energized, and, so, magnet armature 192 remains in its home position; in this way inlet 198 is shut off from outlet 200 of air-admission valve 133. To vent control inlet 82 of relay valve 64, vent valve 134 places its inlet 158 in communication with one of its two outlets 154 or 160, depending on whether slow venting or sudden venting of control input 82 of relay valve 64 is to take place.

At both ends of magnet armature 192, or at least at the end associated with inlet 198, there is disposed an elastomeric insert 202, 204. Elastomeric inserts 202, 204 can also be designed in one piece, by providing magnet armature 192 with a through bore, through which the elastomeric insert extends. Elastomeric insert 202 associated with inlet 198 of air-admission valve 133 forms a valve seat together with a shaped projection 206 on valve head 182.

Figure 3:
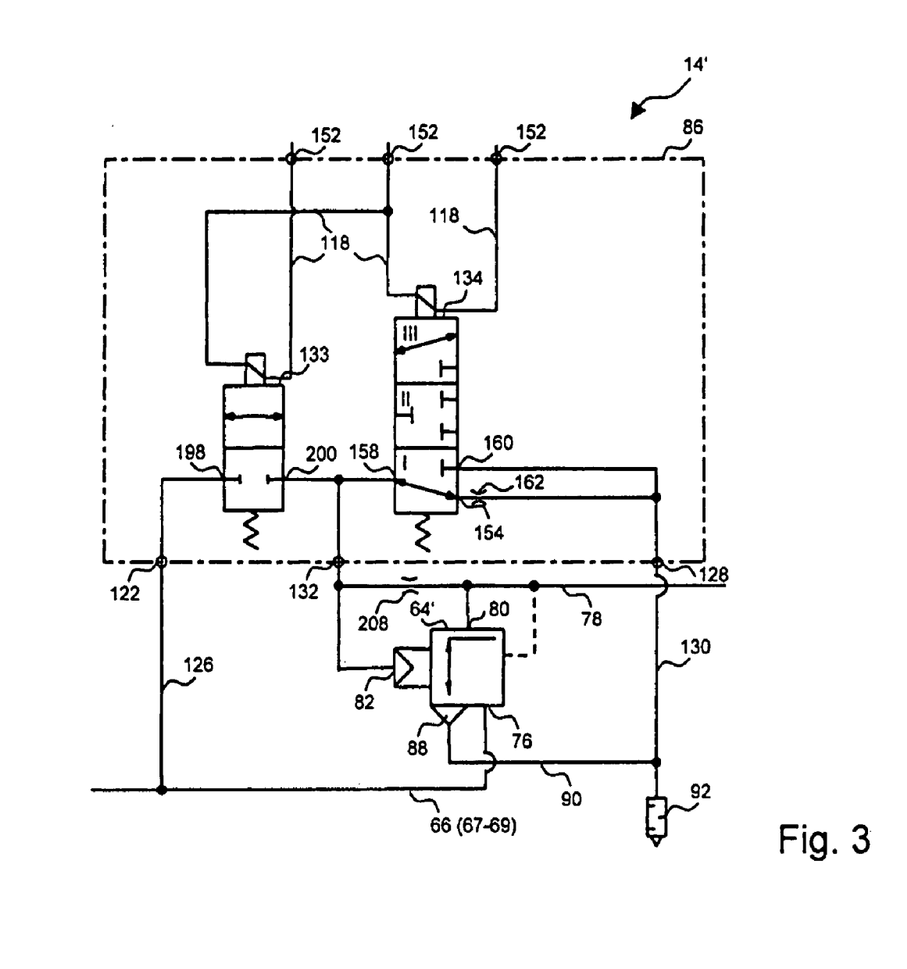
FIG. 3 is a simplified schematic diagram of a brake control device for a parking brake, including a valve unit according to a further exemplary embodiment of the present invention.

FIG. 3 shows a further exemplary embodiment of a parking-brake module 14', which corresponds largely to parking-brake module 14 shown in FIG. 1. However, the parking-brake module 14' shown in FIG. 3 reveals only valve unit 86 for the tractor, whereas valve 110 for the trailer is not illustrated. In FIG. 3, therefore, like reference numerals denote like parts as in FIG. 1 and FIG. 2. Accordingly, the foregoing discussion need not be repeated.

In certain driving situations, such as, for example, during a failure of the electrical power supply, spring-actuator part 30 is to be vented slowly via orifice 162. However, since the control volume of relay valve 64 or 64' is very small, venting of control input 82 of relay valve 64, 64' is permitted only through a very small orifice 162. Therefore, orifice 162 would inherently have to be designed with a very small diameter. However, a very small diameter can become clogged by dirt or ice. In turn, throttled venting could be made inoperative by dirt or ice, and, thus, safe venting of spring-actuator part 30 of the spring-actuated brake cylinders could no longer be assured. Nevertheless, in order to ensure slow venting with a sufficiently large cross section of orifice 162, the control volume of the relay valve is virtually enlarged by establishing communication between control input 82 and outlet 80 of relay valve 64'. Such communication has the form, for example, of a through bore in the relay piston, thus forming an orifice 208. Orifice 208 increases the amount of air to be vented in the control area of relay valve 64'. In this way, the working volume at control input 82 of relay valve 64' can be vented sufficiently slowly despite a sufficiently large opening of orifice 162—to reduce the danger of fouling by dirt or ice.

Orifice 208 of the relay piston of relay valve 64' is advantageously provided with a larger cross-sectional area than the cross-sectional area of orifice 162 of valve unit 86. In this way, the pressure at control input 82 of relay valve 64' corresponds substantially to the pressure at outlet 80 of relay valve 64'. Thus, venting of spring-actuator part 30 no longer takes place via vent port 88 of relay valve 64' or does so to only an immaterial extent. Instead, substantially the entire volume of spring-actuator part 30 as well as the control volume at control input 82 of relay valve 64' is vented via orifice 162 and in sufficiently slow manner by virtue of the small opening of orifice 162.

Figure 4:
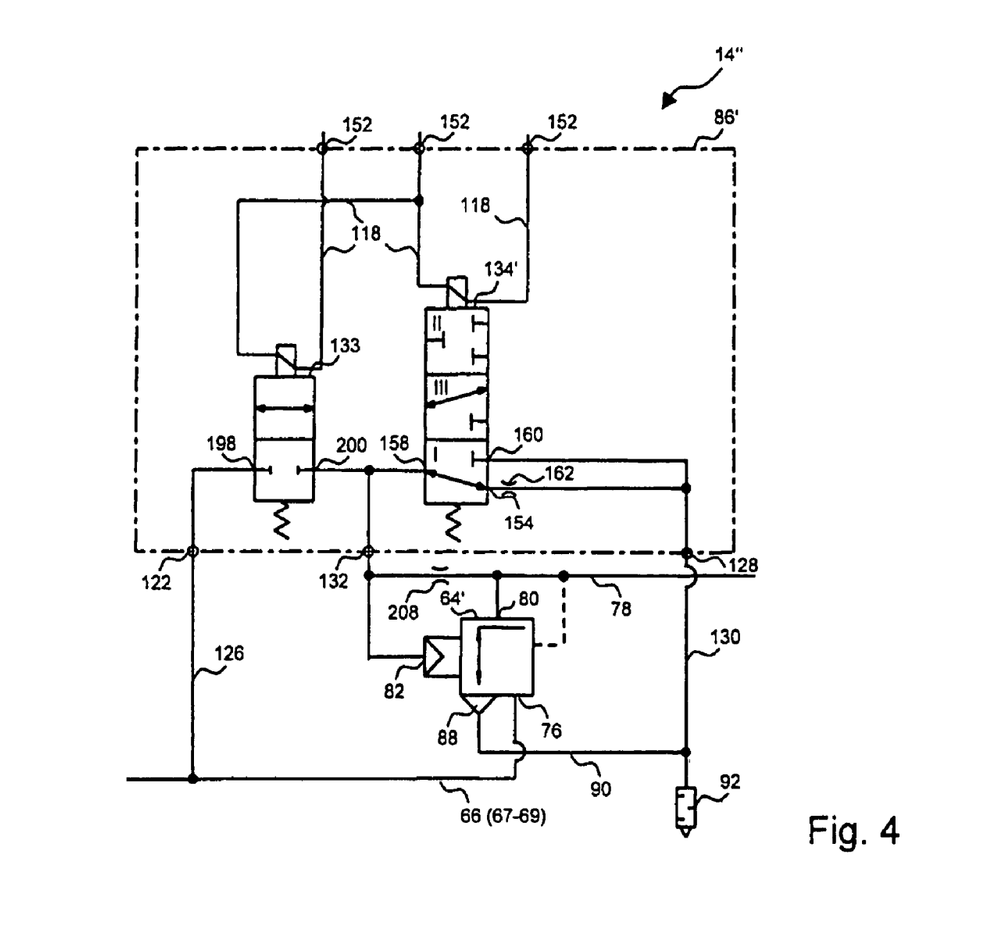
FIG. 4 is a simplified schematic diagram of a brake control device for a parking brake, including a valve unit according to a further exemplary embodiment of the present invention.

FIG. 4 shows another exemplary embodiment of a parking-brake module 14". However, the design of vent valve 134' in the parking-brake module 14" shown in FIG. 4 differs from that of the previous exemplary embodiments. Otherwise, however, parking-brake module 14" and, thus, also, valve 86' corresponds to the parking-brake module 14' and to the valve unit 86, respectively, as shown in FIG. 3. Like reference numerals therefore denote like parts, and the foregoing discussion need not be repeated.

A special feature of valve unit 86' includes the different design of vent valve 134', in which second condition II and third condition III are interchanged. However, first condition I remains unchanged. This interchange of conditions means that, in the case of injection of a first low solenoid current into the solenoid of vent valve 134', sudden venting of control input 82 of relay valve 64, 64' takes place and, thus, the parking brake is applied suddenly. Only when vent valve 134' is energized with a higher current does inlet 158 of vent valve 134' become shut off from its outlets 154, 160.

In the event of a power failure, this exemplary embodiment might seem to establish first condition I of vent valve 134' only after third condition III has been briefly turned on. However, since vent valve 134' is designed as a double-armature solenoid valve, both the primary armature and the secondary armature of vent valve 134' are switched to their respective home positions at substantially the same time in the event that the coil of vent valve 134' is switched to de-energized condition. To this extent, the duration for which third condition III is active, as shown in the exemplary embodiment in FIG. 4, is negligible, and it has no significant effect on the operation of venting of control input 82 of relay valve 64'.

A valve unit of simple and inexpensive design that simultaneously ensures safe parking of the vehicle even in the event of failure of the electrical power supply is provided by virtue of the inventive double-armature solenoid valve for the vent valve with an orifice for slow venting and an outlet for fast venting.

Because of the air-admission valve connected between the control input of the relay valve and the compressed-air reservoir, and also because of the vent valve connected between the control input of the relay valve and a venting device, almost any desired pressure value up to the level of the pressure in the reservoir tanks can be applied at the control input of the relay valve by means of appropriate opening times of the two valves. Since the spring-actuated brake cylinders do not have to be pressurized with the full reservoir pressure in order to release the parking brake, it is therefore also possible to specify a lower pressure at the control input of the relay valve, which pressure is then supplied correspondingly to the spring-actuator part of the spring-actuated brake cylinders. In this way, it is possible, by means of the two valves, namely, the air-admission valve and the vent valve, to also achieve a pressure-limiting function at the control input of the relay valve and, thus, also in the spring-actuated brake cylinders. Such pressure limitation is advantageous not only for energy consumption or for the consumption of compressed air but also for the noise generated during venting.

On the whole, the embodiments according to the present invention permits simple implementation of a parking brake that ensures a safe condition even in the event of failure of the electrical power supply and, moreover, that can be actuated by purely electrical means. In particular, the pneumatic tubing that has often been common heretofore in the operator's cab for the purpose of activating the parking brake can be omitted, and operator-control of the parking brake can be achieved completely via an electrical actuating means.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A valve unit for an electropneumatic brake control device for controlling an air-flow-boosting valve device for controlling a parking brake of a vehicle, the valve unit comprising a vent valve for venting a control input of said air-flow-boosting valve device, said vent valve having a first operating state wherein said control input of said air-flow-boosting valve device can be vented in throttled manner via an orifice and at least one duct, said orifice and said at least one duct being configured to place a first outlet of said vent valve in pneumatic communication with a port of said valve device, a second operating state wherein said control input of said air-flow-boosting valve device cannot be vented, and a third operating state wherein said control input of said air-flow-boosting valve device can be vented in unthrottled manner via a vent device other than said orifice.

2. The valve unit according to claim 1, wherein said vent valve is a double-armature solenoid valve having a primary magnet armature and a secondary magnet armature disposed in a common armature-guide housing and each loaded with a spring, said solenoid valve being actuatable by a solenoid for said primary and said secondary magnet armatures.

3. The valve unit according to claim 2, wherein said double-armature solenoid valve has (i) an inlet associated with said secondary magnet armature that can be placed in communication with said control input of said air-flow-boosting valve device, (ii) a first outlet associated with said primary magnet armature that can be placed in throttled communication with a venting device via said orifice, and (iii) a second outlet associated with said secondary magnet armature that can be placed in unthrottled communication with said venting device.

4. The valve unit according to claim 3, wherein:
a) when said solenoid is de-energized, said primary magnet armature and said secondary magnet armature are in spring-loaded home positions, said vent valve occupying said first operating state whereby said inlet is in communication with said first outlet and shut off from said second outlet,
b) by injection of a first solenoid current of predefined intensity flowing through said solenoid, said primary magnet armature is displaceable to a switching position determined by the magnetic force, and said secondary magnet armature is disposed in spring-loaded home position, said vent valve occupying said second operating state whereby said inlet is shut off from said first outlet and said second outlet, and
c) by injection of a second solenoid current of predefined intensity flowing through said solenoid, said second solenoid current being greater than said first solenoid current, both said primary armature and said secondary armature are displaced to switching positions determined by the magnetic force, said vent valve occupying said third operating state whereby said inlet is in communication with said second outlet and is shut off from said first outlet.

5. The valve unit according to claim 3, wherein:
a) when said solenoid is de-energized, said primary magnet armature and said secondary magnet armature are in spring-loaded home positions, said vent valve occupying said first operating state whereby said inlet is in communication with said first outlet and shut off from said second outlet,
b) by injection of a first solenoid current of predefined intensity flowing through said solenoid, said primary magnet armature is displaceable to a switching position determined by the magnetic force, and said secondary magnet armature is disposed in spring-loaded home position, said vent valve occupying said third operating state whereby said inlet is in communication with said second outlet and shut off from said first outlet, and
c) by injection of a second solenoid current of predefined intensity flowing through said solenoid, said second solenoid current being greater than said first solenoid current, both said primary magnet armature and said secondary magnet armature are displaceable to switching positions determined by the magnetic force, said vent valve occupying said second operating state whereby said inlet is shut off from said first outlet and said second outlet.

6. The valve unit according to claim 3, further comprising an air-admission valve having an inlet and an outlet, wherein:
a) said inlet of said air-admission valve is in communication with a first connecting member that can be placed in communication with a compressed-air reservoir,
b) said first outlet of said vent valve is in communication via said orifice and said second outlet of said vent valve with a second connecting member that can be placed in communication with said venting device, and
c) said outlet of said air-admission valve is in communication with said inlet of said vent valve and with a third connecting member that can be placed in communication with said control input of said air-flow-boosting valve device.

7. The valve unit according to claim 2, wherein said primary magnet armature and said secondary magnet armature have different diameters.

8. The valve unit according to claim 7, wherein said secondary magnet armature has a smaller diameter than said primary magnet armature.

9. The valve unit according to claim 2, wherein said primary magnet armature and said secondary magnet armature are pulled to different depths into said solenoid.

10. The valve unit according to claim 9, wherein said primary magnet armature is pulled more deeply into said solenoid than said secondary magnet armature.

11. The valve unit according to claim 2, wherein the spring force exerted on said primary magnet armature by said spring associated with said primary magnet armature is smaller than the spring force exerted on said secondary magnet armature by said spring associated with said secondary magnet armature.

12. The valve unit according to claim 2, wherein said primary magnet armature and said secondary magnet armature are substantially identical.

13. An electropneumatic brake control device for controlling a vehicle parking brake, comprising pneumatically actuatable brake cylinders for actuation of wheel brakes, at least one of said brake cylinders being a spring-actuated brake cylinder having a spring-actuator part that can actuate said parking brake, at least one valve unit according to claim 1 having a connecting member in communication with a pneumatic control input of an air-flow-boosting valve device, said air-flow-boosting valve device having an inlet in communication with a compressed-air supply line to a compressed-air reservoir and an outlet in communication with a compressed-air line to said spring-actuator part of said spring-actuated brake cylinder, wherein pressure at said outlet of said air-flow-boosting valve device is controllable by control pressure applied at said pneumatic control input.

14. An electrically controlled pneumatic vehicle brake system, comprising a service brake, a brake control device according to claim 11, and a parking brake, said service brake including a brake pedal and pneumatically actuatable brake cylinders, one of said brake cylinders being in communication with said brake pedal, at least one of said brake cylinders being a spring-actuated brake cylinder having a spring-actuator part that can actuate said parking brake, and said parking brake including a parking-brake signal transducer for actuating said parking brake by venting said spring-actuator part of said spring-actuated brake cylinder.

15. A vehicle comprising an electrically controlled pneumatic vehicle brake system according to claim 14.

16. The brake control device according to claim 13, wherein said air-flow-boosting valve device is a relay valve having a relay piston with an opening by which an outlet of said relay valve is placed in throttled communication with a control input of said relay valve.

17. The brake control device according to claim 16, wherein said opening has a larger cross-sectional area than the cross-sectional area of an orifice of said valve unit.

18. The brake control device of claim 13, wherein said connecting member of said at least one valve unit is in direct communication with said pneumatic control input of said air-flow-boosting valve device.

* * * * *